US012650077B2

(12) United States Patent
Mohammed et al.

(10) Patent No.: US 12,650,077 B2
(45) Date of Patent: Jun. 9, 2026

(54) METHOD AND APPARATUS FOR CONTROLLED THICKNESS PATCH ADJACENT FILLETED SURFACES

(71) Applicant: RTX CORPORATION, Farmington, CT (US)

(72) Inventors: Sohail Mohammed, Manchester, CT (US); William Bogue, Hebron, CT (US); Austin Conrad Peters, Norman, OK (US); Giovanny Soto Acevedo, Moca, PR (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/905,795

(22) Filed: Oct. 3, 2024

(65) Prior Publication Data

US 2026/0098475 A1     Apr. 9, 2026

(51) Int. Cl.
*F01D 5/00* (2006.01)
*B23P 6/00* (2006.01)
*B23P 6/04* (2006.01)

(52) U.S. Cl.
CPC .............. *F01D 5/005* (2013.01); *B23P 6/002* (2013.01); *B23P 6/007* (2013.01); *B23P 6/045* (2013.01);
(Continued)

(58) Field of Classification Search
CPC ................ F01D 5/005; F05D 2230/80; F05D 2300/611; B23P 6/00; B23P 6/02; B23P 6/04; B23P 6/045; B23P 6/007
See application file for complete search history.

(56) References Cited

U.S. PATENT DOCUMENTS 7,614,848 B2 * 11/2009 Bogue .................... F01D 9/042
                                                    415/200
7,842,335 B2 * 11/2010 Skoog .................... F01D 5/288
                                                    427/403

(Continued)

FOREIGN PATENT DOCUMENTS

CN          103381534 A     11/2013
EP          3409456 A1     12/2018
(Continued)

OTHER PUBLICATIONS

European Search Report dated Jan. 2, 2026 issued in corresponding application 25192179.7.

*Primary Examiner* — Sarang Afzali
(74) *Attorney, Agent, or Firm* — Christopher B. Kilner; MILLEN, WHITE, ZELANO & BRANIGAN

(57)          ABSTRACT

A method and apparatus for applying a controlled thickness patch of repair material to a damaged surface adjacent a filleted surface disposed between a case surface and a strut is disclosed. A spacer is positioned on the case surface adjacent the filleted surface, with an outermost surface of the spacer dimensioned to intersect the filleted surface at a predetermined drop height from the case surface. Repair material is applied to the damaged surface by screeding with a straight edge. The straight edge is positioned with a first end against the outermost surface of the spacer and the filleted surface at the drop height, and a second end positioned against the strut or a guide mask disposed thereon so as to form a controlled thickness patch of repair material to the strut and filleted surface when the repair material is screeded.

10 Claims, 8 Drawing Sheets

(52) U.S. Cl.
      CPC .... *F05D 2230/80* (2013.01); *F05D 2300/611*
                                                   (2013.01)

(56)                    References Cited

U.S. PATENT DOCUMENTS

| | | | | |
|---|---|---|---|---|
| 7,934,315 | B2 * | 5/2011 | Milleville | ............... B23P 6/002 |
| | | | | 29/402.09 |
| 8,883,936 | B2 | 11/2014 | Odaka et al. | |
| 9,770,791 | B2 * | 9/2017 | Hong | ........................ B64F 5/40 |
| 10,094,220 | B2 * | 10/2018 | Vontell, Sr. | ........... B32B 27/283 |
| 10,927,684 | B2 | 2/2021 | Bogue et al. | |
| 11,891,912 | B2 | 2/2024 | Srinivasan et al. | |
| 2008/0159870 | A1 | 7/2008 | Hong | |
| 2012/0304646 | A1 | 12/2012 | Palmisano et al. | |
| 2013/0294904 | A1 | 11/2013 | Hunt et al. | |
| 2025/0101251 | A1 | 3/2025 | Kawashima et al. | |

FOREIGN PATENT DOCUMENTS

| | | | |
|---|---|---|---|
| EP | 3858588 | A1 | 8/2021 |
| JP | 2001252835 | A | 9/2001 |
| JP | 3920936 | B2 | 5/2007 |
| JP | 6154432 | B2 | 6/2017 |
| KR | 10-2024-0095232 | A | 6/2024 |

\* cited by examiner

800

810 — Position Spacer Adjacent Filleted Surface and Damage Area

820 — Apply Repair Material to the Damage Area

830 — Screed Repair Material with Straight Edge to Form Controlled Thickness Patch

METHOD AND APPARATUS FOR CONTROLLED THICKNESS PATCH ADJACENT FILLETED SURFACES

This invention was made with Government support under Contract No. N00019-23-C-0056 awarded by U.S. Department of Defense. The Government has certain rights in the invention.

FIELD OF THE INVENTION

The subject matter disclosed herein relates to applying a layer of patch material to repair a coating and, in particular, to a method and apparatus for applying a controlled thickness of patch material adjacent a filleted surface.

BACKGROUND OF THE INVENTION

A fan inlet case (FIC) assembly is a structural frame that is commonly used at the forward end of an aircraft engine. The FIC assembly may include of plurality of struts between an inner case and an outer case where the leading edge, side surfaces, and trailing edge of each strut may be wrapped with a composite shell which is erosion coated.

Composite FIC struts of aircraft engines are subject to damaged or missing coating that may be repaired with a patch of coating material. A currently available repair process involves screeding a repair material over the region of missing coating following cleaning, surface preparation, and priming of the affected area per a process appropriate for the base material. A thickened coating material (such as a paste) is applied as opposed to a sprayed or brushed coating to maintain a consistent coating thickness. The patch results in a suitable and smooth surface finish per aerodynamic and ice accretion mitigation requirements. In this process, guide masking tapes are used to control a thickness of the repair material.

The current process is only suitable for applications where an undamaged coating is present both inboard and outboard of the area of missing coating because these undamaged areas are used to establish the patch area thickness by registering thickness on each end with a straight edge. For example, as illustrated in FIG. 1, when the region of damage area 30 on the strut 10 is too close to the filleted surface R at the end of the strut 10 where it meets the outer case 20, the guide masking tapes (not shown) used to set the screeded material thickness of the patch will be difficult to apply without wrinkles due to the compound curvature caused by the filleted surface R. Additionally, the straight edge may inadvertently contact the filleted surface R and move to a height above the guide masking tape, resulting in an uneven thickness.

It would be desirable to permit a straight edge of a screeding tool such as a doctor blade A to be positioned to remain at a constant drop height from the outer case 20, i.e, such that the straight edge can ride on remaining undamaged filleted surface R without the need for the problematic masking tape, to produce a patch of desired thickness. However, controlling that height exposes a need to define a method to control that positioning that will minimize the screeded material thickness variation while still providing a smooth and uniform coating which will satisfy the aerodynamic and the aerothermal requirements for the part.

The above information disclosed in this Background section is only for understanding of the background of the inventive concepts and, therefore, it may contain information that does not constitute prior art.

SUMMARY OF THE INVENTION

The present disclosure is directed, in a first aspect, to a method for applying a controlled thickness patch of repair material to a damaged surface adjacent a filleted surface disposed between a case surface and a strut. In an embodiment, the method includes positioning a spacer on the case surface at a position adjacent the filleted surface, wherein an outermost surface of the spacer disposed opposite the case surface intersects the filleted surface at a predetermined drop height from the case surface. The method further includes applying repair material to the damaged surface, the repair material being thixotropic, and screeding the repair material with a straight edge, the straight edge positioned substantially parallel to the strut, a first end of the straight edge positioned against the outermost surface of the spacer and the filleted surface at the drop height, and a second end of the straight edge positioned against the strut or a guide mask disposed thereon so as to form a controlled thickness patch of repair material to the strut and filleted surface.

In an embodiment of the method, the spacer may include one or more shims.

In another embodiment of the method, the spacer may include a gage.

In a further embodiment of the method, the gage may be a notched gage that includes a notch shaped to substantially conform to the filleted surface at a leading edge or trailing edge of the strut, and positioning the spacer may include positioning the notch against the leading edge or trailing edge of the strut.

In yet another embodiment of the method, the notched gage may include a first surface shaped to substantially conform to the case surface, and positioning the spacer may include positioning the first surface against case surface.

In an embodiment of the method, the notched gage may further include a second surface opposite the first surface that is substantially flat and forms the outermost surface of the spacer.

In another embodiment of the method, screeding the repair material with the straight edge may include screeding from a first side of the strut in a direction towards the leading or trailing edge of the strut, swinging the straight edge around the leading or trailing edge of the strut, and screeding a second side of the strut in a direction away from the leading or trailing edge of the strut.

The present disclosure is directed, in a second aspect, to a system for applying a controlled thickness patch of repair material to a damaged surface adjacent a filleted surface disposed between a case surface and a strut. The system includes a spacer configured to be positioned on the case surface adjacent the filleted surface, wherein an outermost surface of the spacer disposed opposite the case surface is dimensioned to intersect the filleted surface at a predetermined drop height from the case surface. The system further includes repair material to be applied to the damaged surface, the repair material being thixotropic, and a straight edge configured to screed the repair material, the straight edge configured to be positioned substantially parallel to the strut with a first end of the straight edge positioned against the outermost surface of the spacer and the filleted surface at the drop height, and a second end of the straight edge positioned against the strut or a guide mask applied thereto so as to form a controlled thickness patch of repair material to the strut and filleted surface.

In an embodiment of the system, the spacer may include one or more shims.

In another embodiment of the system, the spacer may include a gage.

In a further embodiment of the system, the gage may be a notched gage that includes a notch shaped to substantially conform to the filleted surface at a leading edge or trailing edge of the strut, and positioning the spacer may include positioning the notch against the leading edge or trailing edge of the strut.

In yet another embodiment of the system, the notched gage may include a first surface shaped to substantially conform to the case surface, and positioning the spacer may include positioning the first surface against case surface.

In an embodiment of the system, the notched gage may further include a second surface opposite the first surface that is substantially flat and forms the outermost surface of the spacer.

In another embodiment of the system, the straight edge may be dimensioned for the first end of the straight edge to contact the spacer and the filleted surface to screed the repair material from a first side of the strut in a direction towards the leading or trailing edge of the strut, swing around the leading or trailing edge of the strut, and screed the repair material on a second side of the strut in a direction away from the leading or trailing edge of the strut.

The present disclosure is directed, in a second aspect, to a gage for use as a spacer when applying a controlled thickness patch of repair material to a damaged surface adjacent a filleted surface disposed between a case surface and a strut. The gage includes a first surface configured to contact the case surface, a second surface opposite the first surface and forming an outermost surface of the spacer, wherein the second surface is spaced from the first surface by a predetermined drop height, and a fillet-adjacent surface extending between the first and second surface.

In an embodiment of the gage, the first surface and second surface may be flat, and in some cases parallel to each other.

In another embodiment of the gage, the first surface may be curved to substantially conform to the case surface.

In a further embodiment of the gage, the second surface may be substantially flat.

In yet another embodiment of the gage, the fillet-adjacent surface may be a substantially U-shaped notch and the fillet-adjacent surface of the notch may be curved to substantially conform to the filleted surface at a leading edge or trailing edge of the strut.

In an embodiment of the gage, the fillet-adjacent surface may be a substantially U-shaped notch and the fillet-adjacent surface of the notch may be chamfered to substantially align with the filleted surface at a leading edge or trailing edge of the strut.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
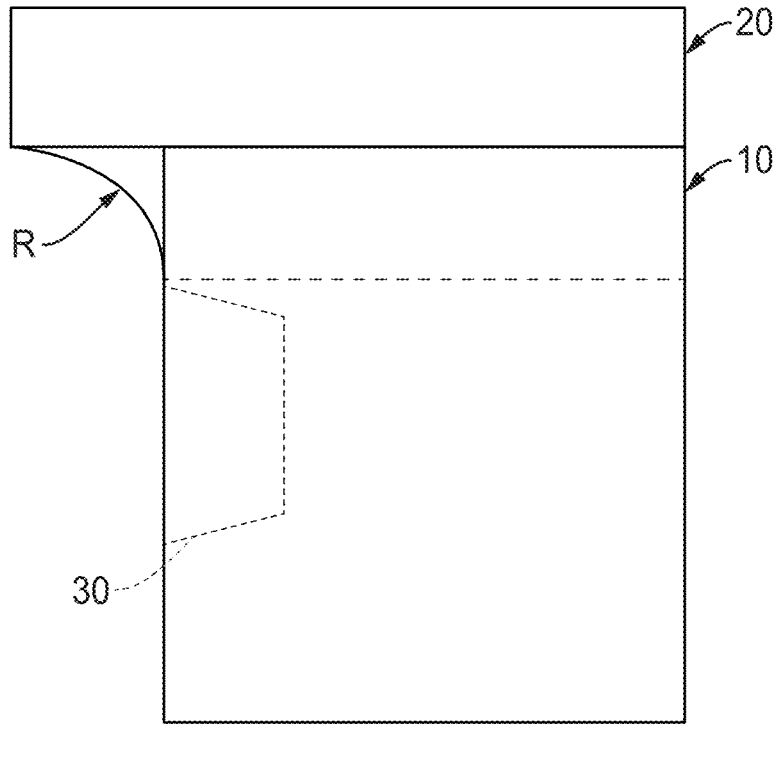
FIG. 1 is a side view of an example damage region on a strut adjacent a filleted surface at an outer case.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed to a method and apparatus for applying a controlled thickness patch of repair material to a strut adjacent a filleted surface.

Figure 2B:
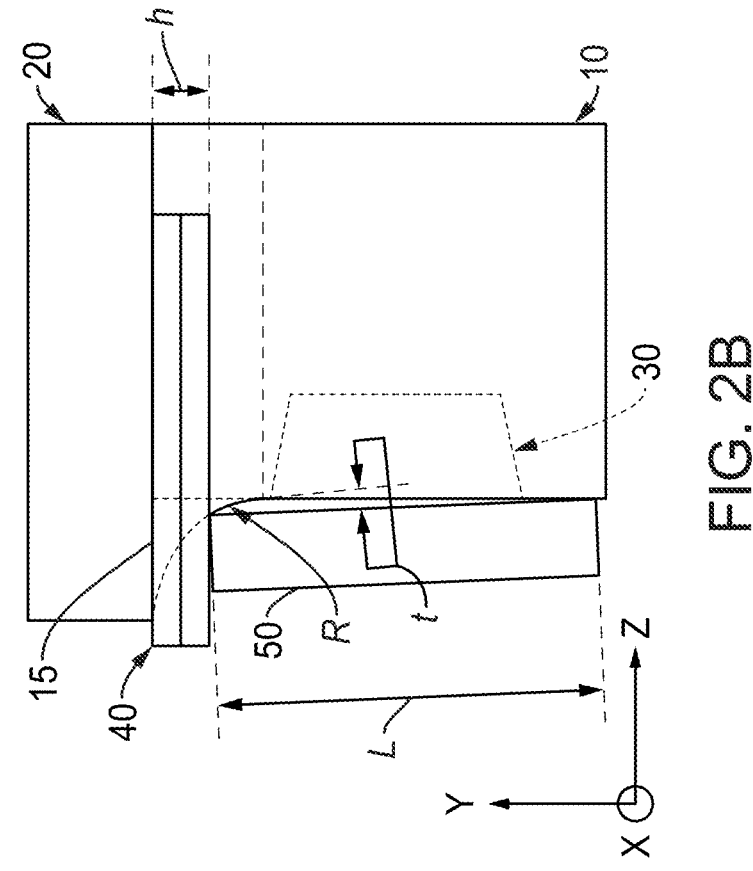
FIGS. 2A and 2B are perspective and side views, respectively, of a first embodiment of the present disclosure.
Figure 2A:
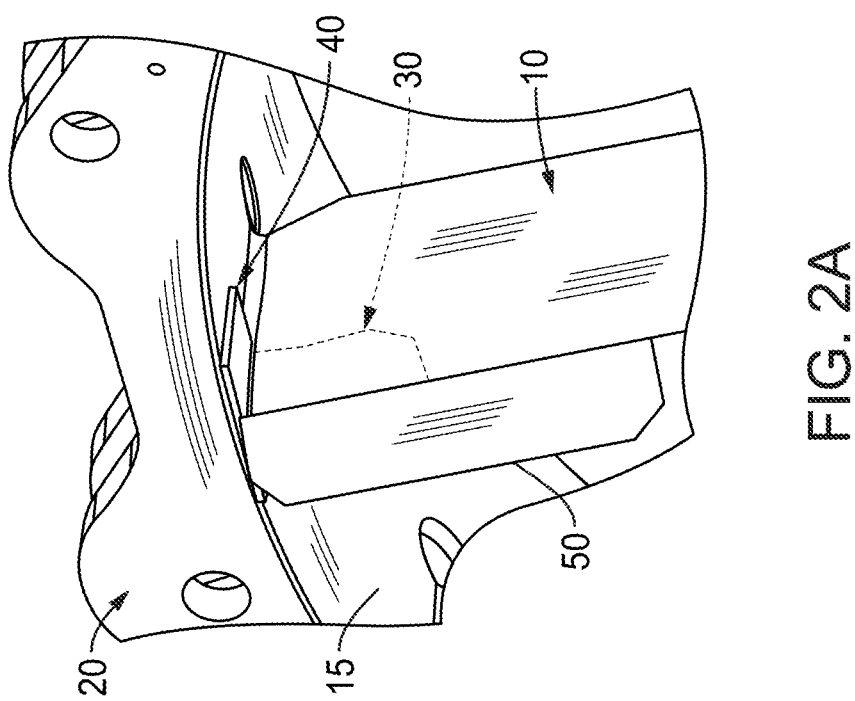
Figure 3B:
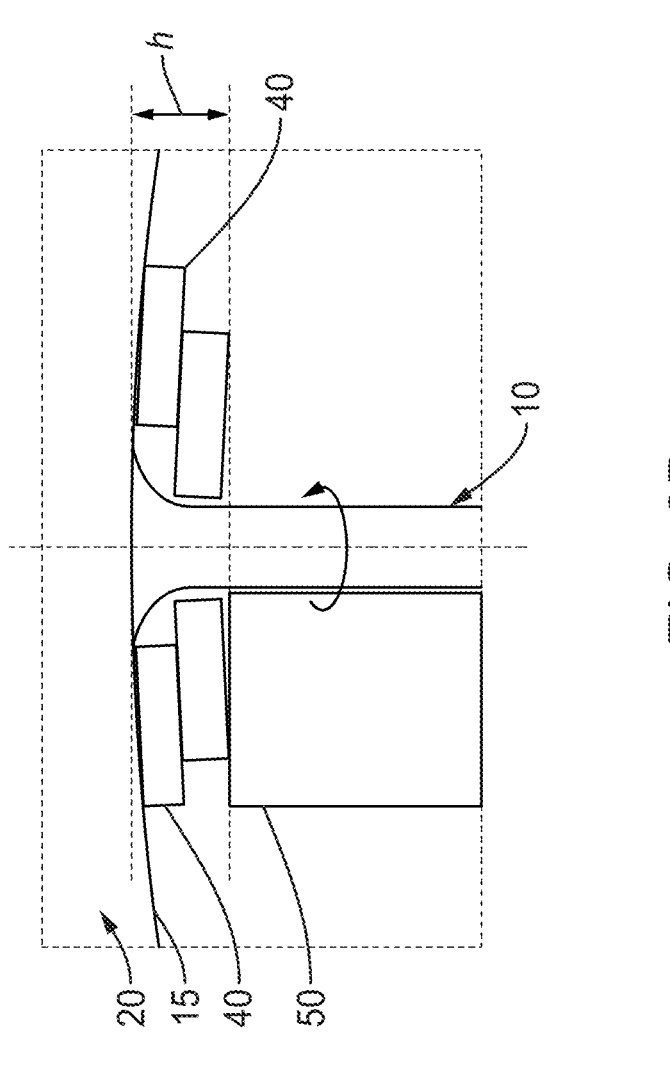
FIG. 3B is a front close-up front view of a portion of an FIC illustrated in FIG. 3A, illustrating a second embodiment of the present disclosure.
Figure 3A:
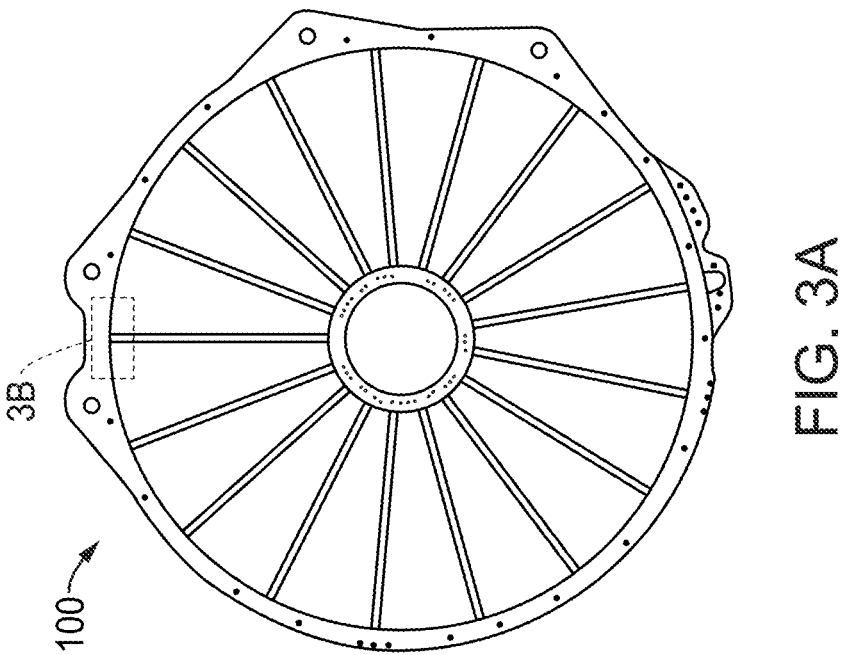

With reference to FIGS. 2A, 2B, and 3, embodiments of a system for applying a controlled thickness patch of repair material to a damage area 30 adjacent a filleted surface R disposed between a case surface 15 and a strut 10 are disclosed. In the present embodiments, the case surface 15 is an inner surface of an outer case 20 of a fan inlet case (FIC) assembly 100. In other embodiments, the case surface 15 may be from an inner case of the FIC assembly at the other end of the strut 10.

A spacer 40 is configured to be positioned on the case surface 15 adjacent the filleted surface R. As illustrated in FIGS. 2A and 2B, the spacer 40 may take the form of a gage 45 (see FIGS. 4-6C), or as illustrated in FIG. 3B, the spacer 40 may take the form of one or more shims, such as 50 mil steel shims. The spacer 40 may be taped or otherwise adhered to the case surface 15 to hold it in position adjacent the filleted surface R.

An outermost surface of the spacer 40 is disposed opposite the case surface 15 and is dimensioned to intersect the filleted surface R in a plane at a predetermined drop height h from the case surface 15, as shown in FIG. 2B and FIG. 3B. The outermost surface of spacer 40 permits a straight edge 50, such as a doctor blade, to have a first end positioned to remain at a constant drop height h from the outer case 20 such that that the first end of the straight edge 50 can ride on remaining undamaged filleted surface R to produce a patch of desired thickness t that tapers (or maintains a thickness) from the filleted surface R at drop height h to a position on the strut 10 at a second end of the straight edge 50 beyond the damage area 30, which may or may not include a guide mask applied thereto, such as guide masking tape (not shown), to register a height of the patch at the lower end and/or prevent excess repair material contacting the undamaged coating on the strut 10.

The straight edge 50 may then be used to apply repair material, such as a paste or other thickened material, to the damage area 30 to form a patch. When the spacer 40 is formed of a plurality of shims as illustrated in the embodiment of FIG. 3B, excess repair material may be deposited adjacent the filleted surface R, which may be removed later, such as by sanding. When the spacer 40 is a gage such as notched gage 45 that closely conforms to the filleted surface R, excess repair material deposition at the filleted surface R may be lessened or avoided so as to reduce or avoid the need for such sanding.

The straight edge 50 may have a length L with an edge extending between first and second ends thereof. The straight edge 50 is configured to be positioned substantially parallel to the strut 10 with the first end positioned against the outermost surface of the spacer 40 and the filleted surface R at the drop height h, and with a second end positioned against the strut or a guide mask applied thereto, such as a guide masking tape (not shown), positioned below the damaged area on the strut so as to form a controlled thickness patch of repair material to the strut 10 and filleted surface R covering the damage area 30.

The straight edge 50 may be dimensioned for the first end of the straight edge 50 to contact the spacer 40 and the filleted surface R and the second end positioned below the damaged area to control the patch size. Patches may be applied to the strut 10 adjacent the filleted surface R on the side surfaces, leading edge, or trailing edge. For example, at the leading edge, the straight edge may screed the repair material from a first side of the strut 10 in a direction towards the leading edge of the strut 10, swing around the leading edge of the strut 10, and then screed the repair material on a second side of the strut 10 in a direction away from the leading edge of the strut 10. While the straight edge 50 swings around the leading edge of the airfoil profile of strut 10, the first end of straight edge 50 maintains contact with the spacer 40 and the filleted surface R in order to control the thickness of the repair material forming the patch.

Figure 4:
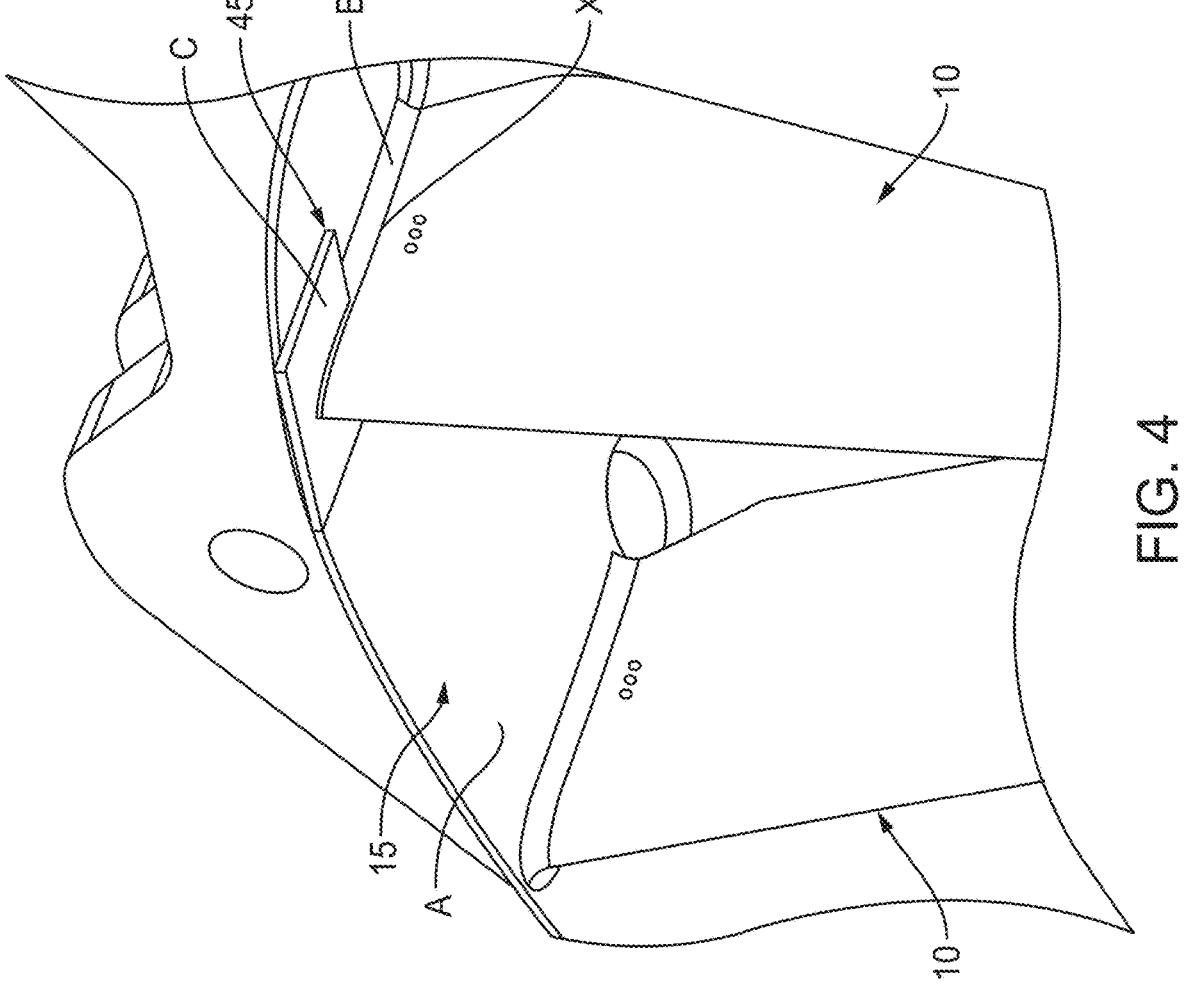
FIG. 4 is a perspective view of a notched gage positioned in accordance with an embodiment of the present disclosure.
Figures 5A, 5B, 5C, 5D:
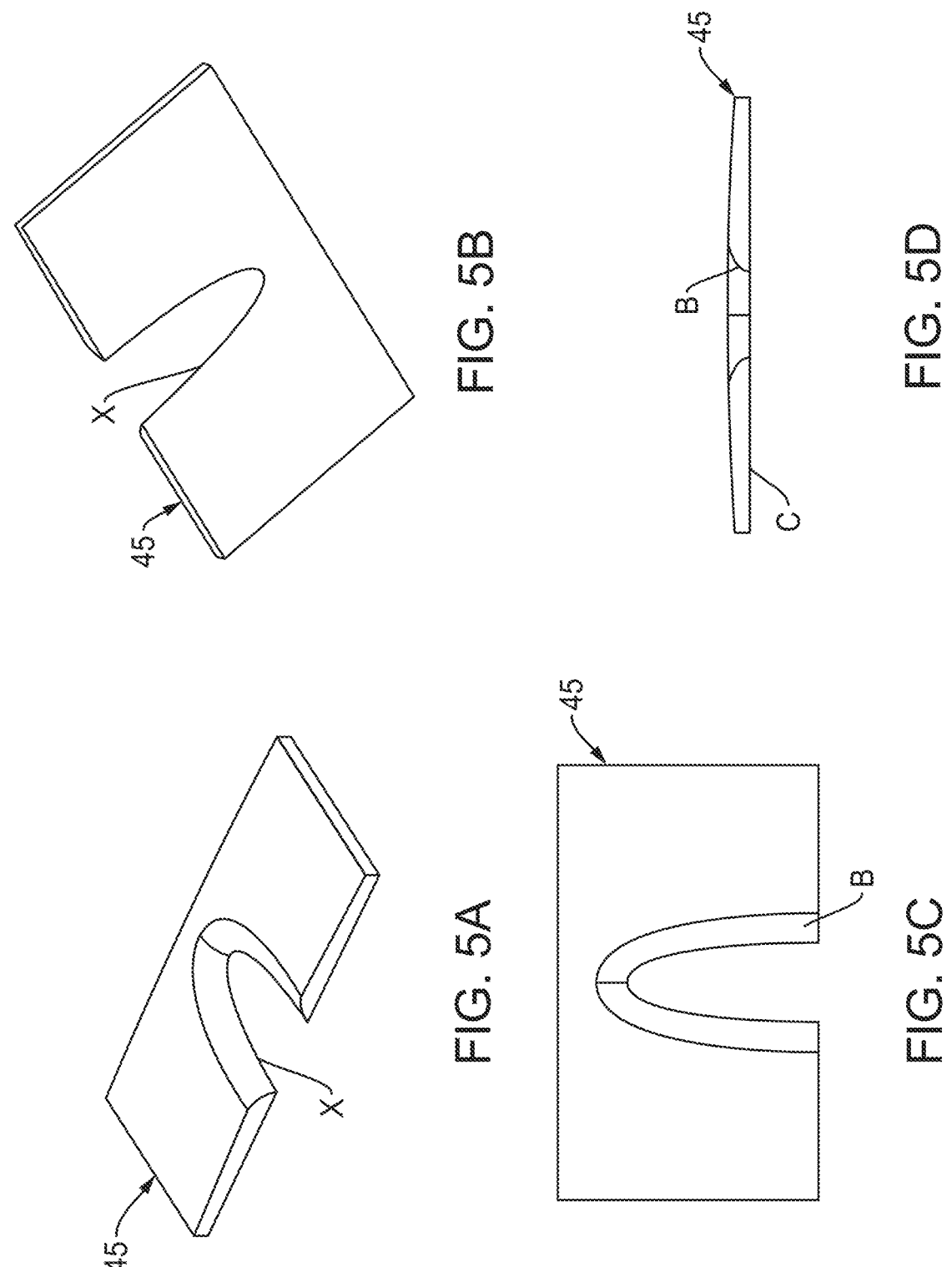
FIGS. 5A, 5B, 5C, and 5D are multiple views of an example notched gage in accordance with an embodiment of the present disclosure.

In one or more embodiments of the present disclosure, the spacer 40 may be formed as a gage that closely conforms to the filleted surface R. A gage for use at a leading or trailing edge may take the form of notched gage 45. Various embodiments of suitable notched gages 45 are illustrated in FIGS. 4-6. Gages without a notch, but rather a shaped edge surface, may also be used for repairs on side surfaces of the strut 10, but a spacer 40 using shims will usually be a cheaper alternative for such patches.

Referring to FIGS. 4 and 5, one or more embodiments of the notched gage 45 includes a first surface A configured to contact the case surface 15 adjacent the filleted surface R and the strut 10. In the embodiment of FIGS. 4 and 5, the first surface A is curved and/or shaped to substantially conform to the case surface 15.

The notched gage 45 further includes a second surface C opposite the first surface A and forming an outermost surface of the notched gage 45 forming spacer 40. The second surface C is spaced from the first surface A by a predetermined drop height h. The predetermined drop height h may be determined based upon a desired thickness of the patch at the filleted surface R. The desired thickness of the patch at this location may be dependent upon various factors, such as an extent of the damage area 30 and if the damage area 30 extends to a portion of the filleted surface R. In many cases, the predetermined drop height h may be constrained by a maximum allowable thickness of coating on the strut.

In this embodiment, the second surface C is substantially flat so that the straight edge 50 may maintain a constant height position relative to the strut 10 based upon a constant drop height h from an intersection of the strut 10 and the case surface 15.

The notched gage 45 also includes a substantially U-shaped notch extending between the first surface A and second surface C that is dimensioned to accommodate a portion of a leading or trailing edge of the strut 10 adjacent the filleted surface R. As illustrated in FIGS. 5A-5D, a surface B is a fillet-adjacent surface of the notch that may be curved to substantially conform to the filleted surface R at a leading edge or trailing edge of the strut 10. The profile X of the notch may be curved to substantially conform to the airfoil shape of the filleted surface R adjacent the leading edge or trailing edge of the strut 10. When a gage without a notch is used for a side surface, the fillet-adjacent surface B and profile X of the gage will substantially conform to the side surface of the strut 10.

Figures 6A, 6B, 6C:
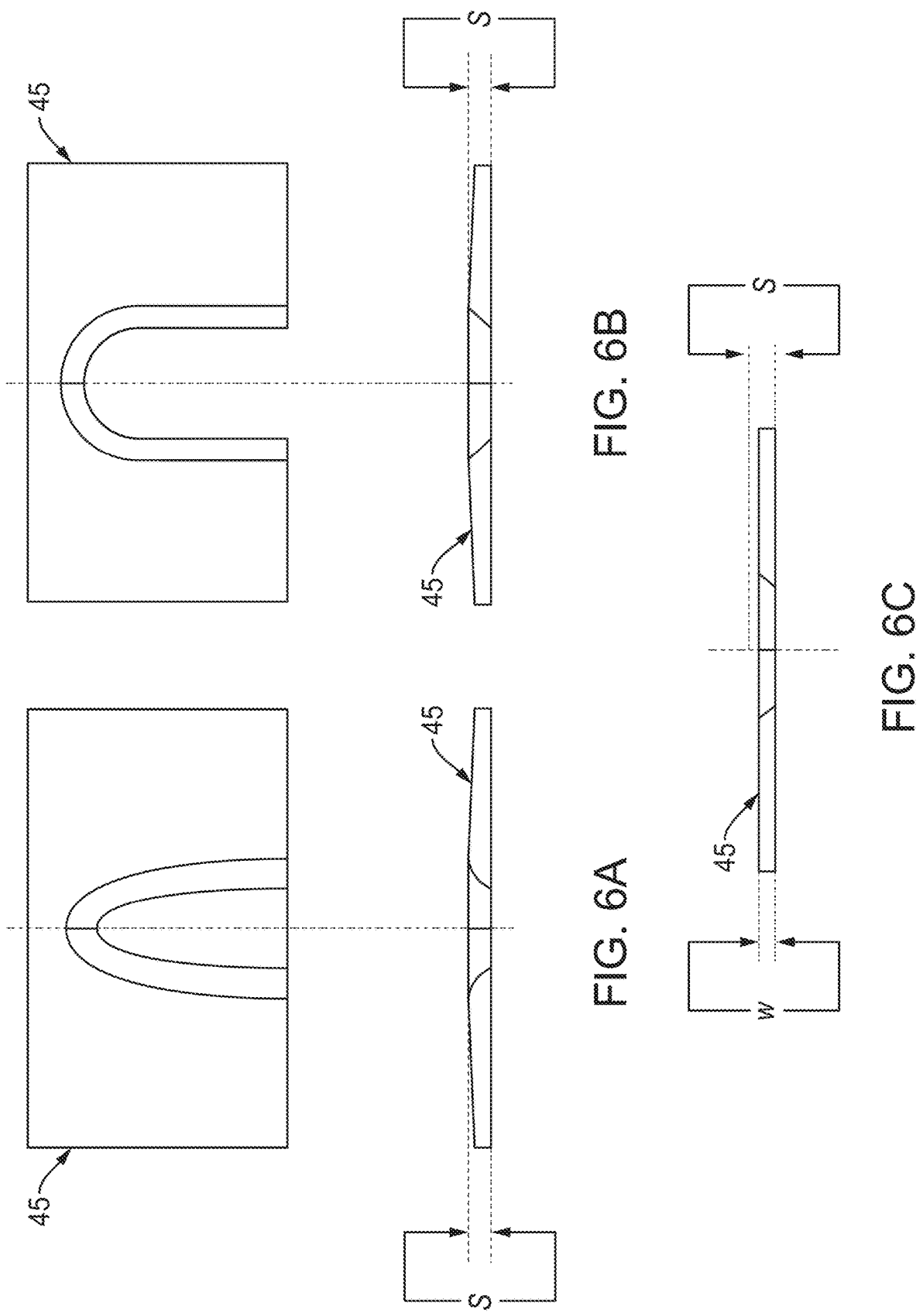
FIGS. 6A, 6B, and 6C are various views of example notched gages produced using additive manufacturing and machining in accordance with embodiments of the present disclosure.

Referring to FIG. 6A, the notched gage 45 of FIGS. 5A-5D may be formed by additive manufacturing such as three dimensional (3D) metal printing with a height S corresponding to the predetermined drop height h. Such manufacturing methods are suitable for providing the compound curves A and B matching the case surface 15 and the filleted surface R for the notched gage 45.

Referring to FIG. 6B, a less complex embodiment of the notched gage 45 may be formed by computer numerical control (CNC) machining of a metal blank. The CNC machined notched gage 45 may have first surface, which may be curved or chamfered, with a height S corresponding to the predetermined drop height h. A fillet-adjacent surface B of the notch may be chamfered to substantially correspond with the filleted surface R and a profile X of the notch may be a slot profile formed of simple lines and a circular radius so as to accommodate the leading edge.

Referring to FIG. 6C, another less complex embodiment includes a flat plate with the surface B of the notch chamfered to substantially correspond with the filleted surface R and a profile X of the notch being a slot profile formed of simple lines and a circular radius so as to accommodate the leading edge as with the embodiment of FIG. 6B. The flat plate of this embodiment has a height w, with first surface A and second surface C being flat. In an embodiment, the first surface A and second surface may be parallel to each other. The notched gage 45 of this embodiment is dimensioned such that when the lateral edges of the notched gage 45 contact the case surface 15, the second surface C will be positioned at a height S corresponding to the predetermined drop height h.

Referring to FIGS. 7A-7C and 8, one or more embodiments of the present disclosure relate to a method 800 for applying a controlled thickness patch of repair material to a damage area 30 adjacent a filleted surface R disposed between a case surface 15 and a strut 10.

Figure 7A:
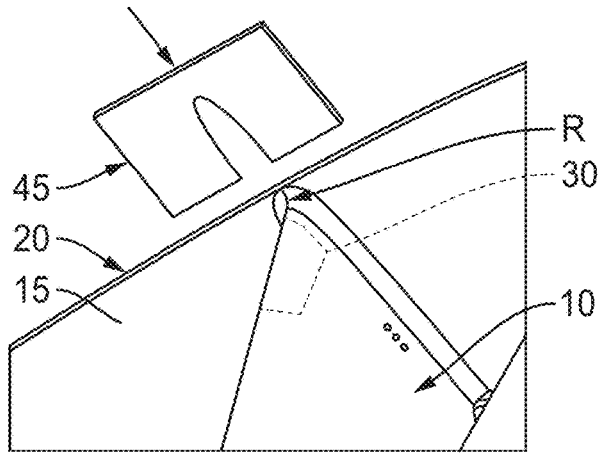
FIG. 7A illustrates a view of an FIC and notched gage prior to placement.
Figures 7B, 7C:
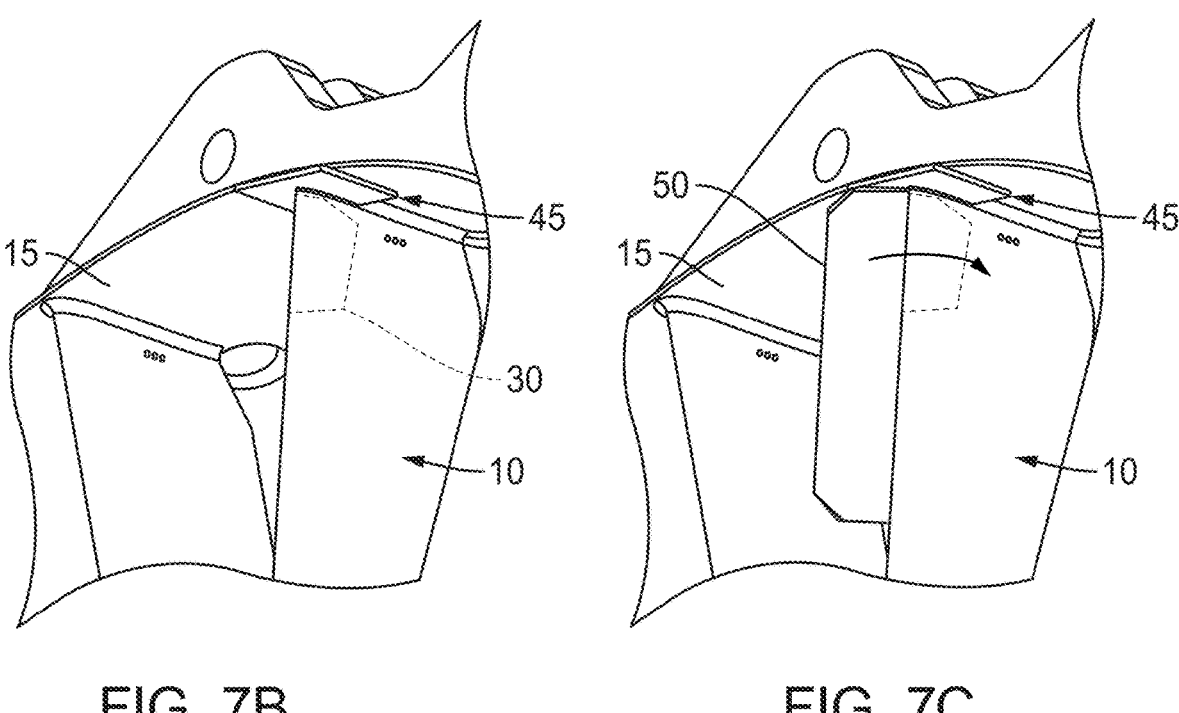
FIG. 7B illustrates a view of the notched gage in position on an FIC.
FIG. 7C illustrates a view of a straight edge applying a patch in accordance with an embodiment of the present disclosure.
Figure 8:
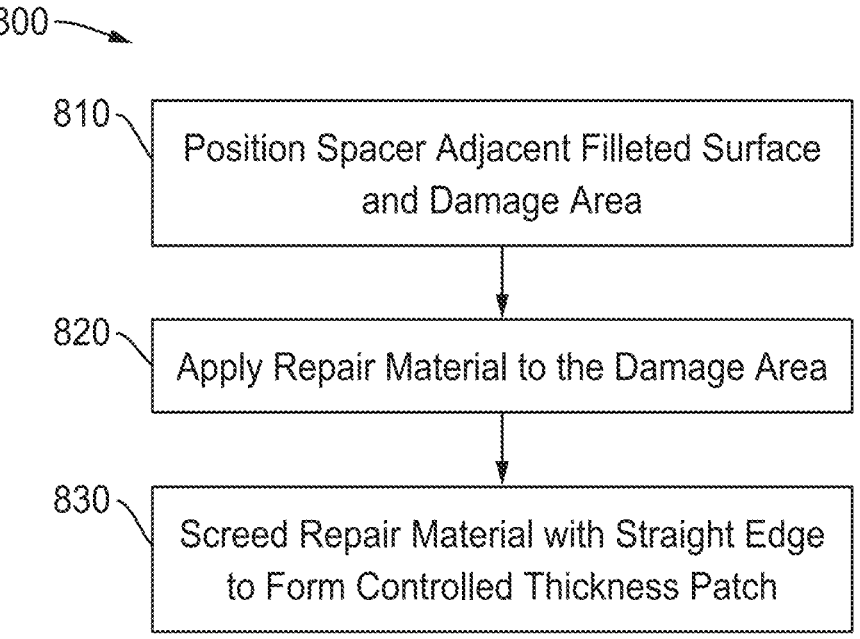
FIG. 8 is a flow diagram of a method in accordance with an embodiment of the present disclosure.

The method 800 includes a first step 810 of positioning a spacer 40, 45 on the case surface 15 at a position adjacent the filleted surface R, wherein an outermost surface of the spacer 40, 45 that is disposed opposite the case surface 15 intersects the filleted surface R at a predetermined drop height h from the case surface 15. Positioning of a notched gage 45 as a spacer 40 is illustrated in FIGS. 7A and 7B.

A next step 820 includes applying repair material in a thickened form (e.g., paste) to the damage area 30 and/or the straight edge 50.

The method 800 further includes a step 830 of screeding the repair material with the straight edge 50, the straight edge 50 having an edge positioned substantially parallel to the strut 10, a first end of the straight edge 50 positioned against the outermost surface of the spacer 40, 45 and the filleted surface R at the drop height h, and a second end of the straight edge 50 positioned against the strut 10 (or guide masking tape disposed thereon) so as to form a controlled thickness patch of repair material to the strut 10 and filleted surface R to cover the damage area 30. The straight edge 50 screeding the repair material is illustrated in FIG. 7C.

In various embodiments of the method 800, the spacer 40 may include one or more shims (see FIG. 3B) or the spacer 40 may include a gage such as a notched gage 45 (see FIGS. 4-7).

In various embodiments of the method 800 with a notched gage 45 as the spacer 40, the notched gage 45 may include a notch shaped to substantially conform to the filleted surface R at a leading edge or trailing edge of the strut 10 and step 810 of positioning the notched gage 45 may include positioning the notch against the leading edge or trailing edge of the strut 10. In other such embodiments of the method 800, the notched gage 45 may include a first surface A shaped to substantially conform to the case surface 15, and step 810 of positioning the spacer 40 comprises positioning the first surface A against case surface 15. In further such embodiments of the method 800, the notched gage 45 may further includes a second surface C opposite the first surface A that is substantially flat and forms the outermost surface of the spacer 40.

In an embodiment of method 800, the step 830 of screeding the repair material with the straight edge 50 may include, as shown in FIG. 7C, screeding from a first side of the strut 10 in a direction towards an edge (leading or trailing) of the strut 10, swinging the straight edge 50 around the edge of the strut 10, and screeding a second side of the strut 10 in a direction away from the edge of the strut 10.

In one or more embodiments, a repair material used for the patch may, for example, be a thixotropic repair material such as a urethane, a fluoroelastomer or a silicone. The repair material should have fillers to modify the polymer to be sufficiently thixotropic to allow material to be disposed on the to the surface with excess thickness to allow for the screeding to reduce the thickness to requirements established by adjacent intact coating. The repair material can be applied to the damage area 30 by extrusion of a bead or film, or by being brushed over the damage area 30. The applied and subsequently screeded repair material should not sag or drip. NuSil™ R40-2186-2, available from Avantor™, is an example of a typical thixotropic repair material.

In one or more embodiments in accordance with the present disclosure, preliminary steps of cleaning, performing surface preparation, and priming of the damage area 30 may be performed per a process appropriate for the base material. Similarly, repair may further include sanding of excess repair material.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A method for applying a controlled thickness patch of repair material to a damaged surface adjacent a filleted surface disposed between a case surface and a strut of a fan assembly of an aircraft engine, the method comprising:

positioning a spacer on the case surface at a position adjacent the filleted surface, wherein an outermost surface of the spacer disposed opposite the case surface intersects the filleted surface at a predetermined drop height from the case surface;

applying repair material to the damaged surface, the repair material being thixotropic; and screeding the repair material with a straight edge, the straight edge positioned parallel to the strut, a first end of the straight edge positioned against the outermost surface of the spacer and the filleted surface at the drop height, and a second end of the straight edge positioned against the strut or a guide mask disposed on the strut so as to form a controlled thickness patch of repair material to the strut and filleted surface.

2. The method of claim 1, wherein the spacer comprises one or more shims.

3. The method of claim 1, wherein the spacer comprises a gage.

4. The method of claim 3, wherein the gage is a notched gage that includes a notch shaped to conform to the filleted surface at a leading edge or trailing edge of the strut, and positioning the spacer comprises positioning the notch against the leading edge or trailing edge of the strut.

5. The method of claim 4, wherein the notched gage includes a first surface shaped to conform to the case surface, and positioning the spacer comprises positioning the first surface against case surface.

6. The method of claim 5, wherein the notched gage further includes a second surface opposite the first surface that is flat and forms the outermost surface of the spacer.

7. The method of claim 3, wherein the gage includes:

a first surface configured to contact the case surface;

a second surface opposite the first surface and forming an outermost surface of the spacer, wherein the second surface is spaced from the first surface by a predetermined drop height; and a fillet-adjacent surface extending between the first and second surface, and positioning the spacer comprises positioning the fillet-adjacent surface of the gage at a position adjacent the filleted surface.

8. The method of claim 7, wherein the fillet-adjacent surface positioned adjacent the filleted surface is a U-shaped notch that is curved to conform to the filleted surface at a leading edge or a trailing edge of the strut, and positioning the fillet-adjacent surface of the gage adjacent the filleted surface includes positioning the U-shaped notch to conform with the filleted surface at the leading edge or the trailing edge of the strut.

9. The method of claim 7, wherein the fillet-adjacent surface positioned adjacent the filleted surface is a U-shaped notch that is chamfered to align with the filleted surface at a leading edge or a trailing edge of the strut, and positioning the fillet-adjacent surface of the gage adjacent the filleted surface includes positioning the U-shaped notch to align with the filleted surface at the leading edge or the trailing edge of the strut.

10. The method of claim 1, wherein screeding the repair material with the straight edge comprises screeding from a first side of the strut in a direction towards the leading or trailing edge of the strut, swinging the straight edge around the leading or trailing edge of the strut, and screeding a second side of the strut in a direction away from the leading or trailing edge of the strut.

* * * * *